(No Model.)
L. POSTAWKA.
DETACHABLE AND ADJUSTABLE SEAT BACK.
No. 274,375. Patented Mar. 20, 1883.
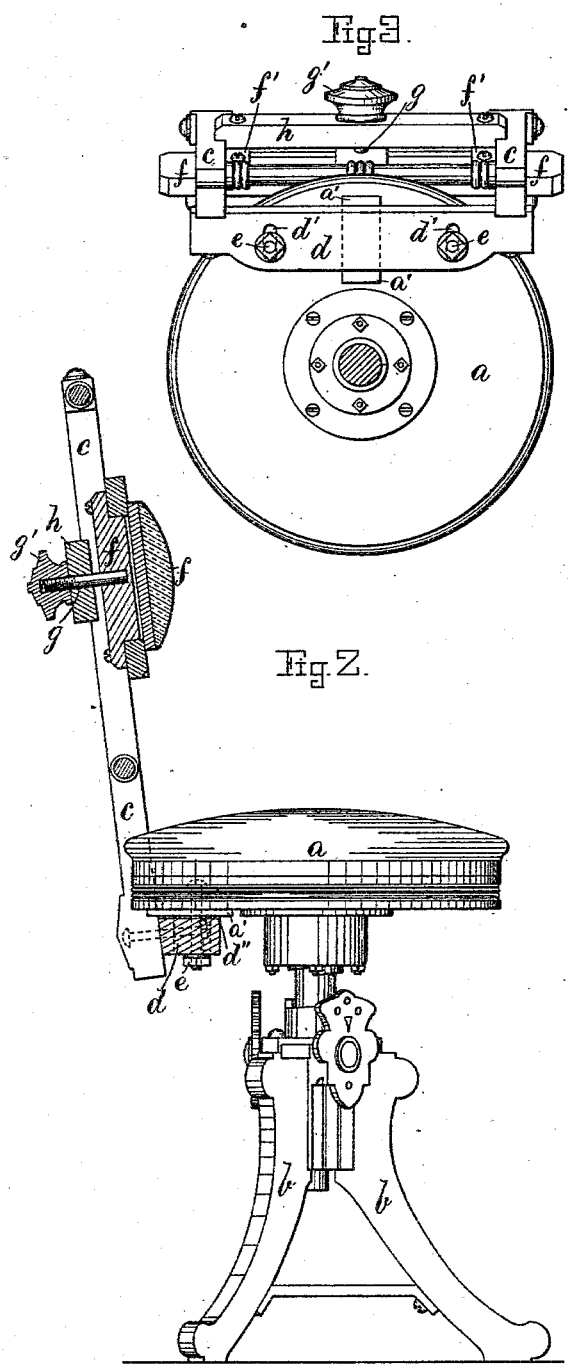
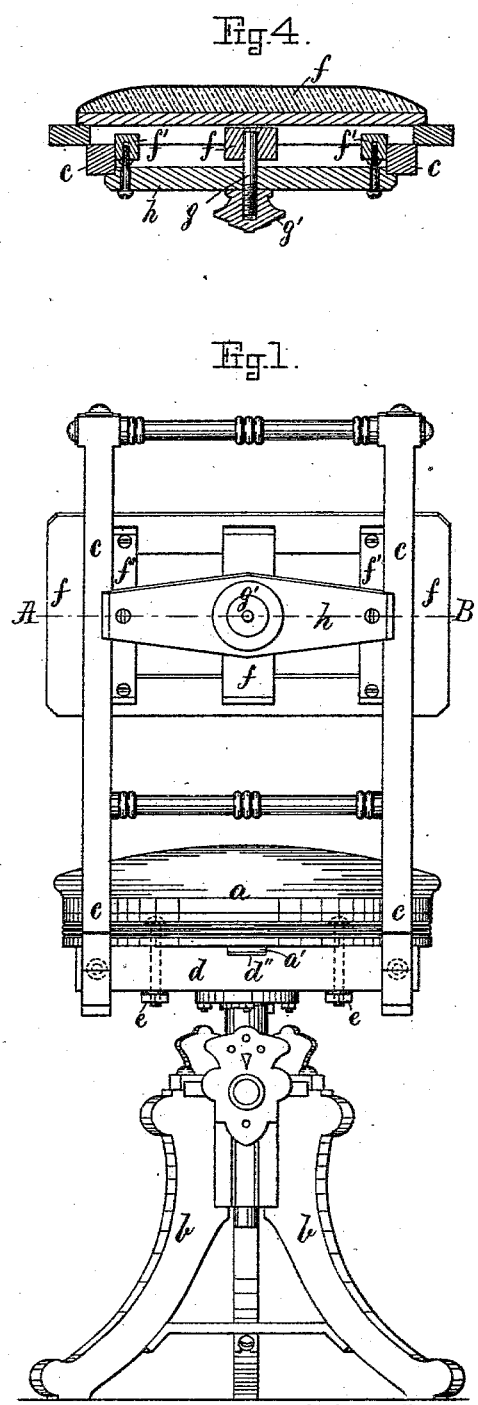

UNITED STATES PATENT OFFICE.

LOUIS POSTAWKA, OF CAMBRIDGEPORT, MASSACHUSETTS.

DETACHABLE AND ADJUSTABLE SEAT-BACK.

SPECIFICATION forming part of Letters Patent No. 274,375, dated March 20, 1883.

Application filed November 20, 1882. (No model.)

*To all whom it may concern:*

Be it known that I, LOUIS POSTAWKA, a citizen of the United States, residing at Cambridgeport, in the county of Middlesex and State of Massachusetts, have invented certain new and useful Improvements in Detachable and Adjustable Seat-Backs; and I hereby declare that the same are fully described in the following specification and illustrated in the accompanying drawings.

This invention relates to improvements in detachable and adjustable seat-backs for chairs, stools, pews, &c., and it is constructed in such a manner as to enable the back to be detached from the seat, and also to allow for a forward and rearward as well as vertical adjustment of the back in relation to the seat, as will hereinafter be more fully shown and described, reference being had to the accompanying drawings, where—

Figure 1 represents a rear view of my improved detachable and adjustable seat-back as applied to a piano or other stool. Fig. 2 represents a sectional side elevation of the same. Fig. 3 represents a bottom view of the seat, and Fig. 4 represents a cross-section on the line A B shown in Fig. 1.

Similar letters refer to similar parts wherever they occur on the different parts of the drawings.

In the drawings, $a$ represents the seat of an ordinary stool or chair, on which $b$ represents the legs or supports, as usual.

$c\ c$ represent the detachable and adjustable back, which is provided at its lower end with a cross-bar or block, $d$, firmly secured to the uprights $c\ c$ by means of screws, bolts, or equivalent means. Through said bar or block $d$ are made one or more slotted perforations, $d'\ d'$, through which one or more fastening-bolts, $e\ e$, pass, and are secured to the bottom of the seat $a$, as shown.

If it is desired to adjust the back in a backward direction to or from the rear of the seat $a$, it is only necessary to loosen the bolts $e\ e$ a little, when the back can be adjusted to the desired position in relation to the seat $a$, and afterward firmly secured thereto by tightening up the screw-bolts $e\ e$.

If it is desired to remove the back altogether from its seat, I unscrew the bolts $e\ e$ from the bottom of the seat $a$, and in this manner detach the back from the seat whenever so required.

To steady the back, and to guide it when adjusted rearwardly in relation to the seat $a$, I provide the latter, on its under side, with one or more horizontal guide-pieces, $a'$, and make on the bar or block $d$ one or more corresponding grooves or recesses, $d''$, in which the guide-piece $a'$ fits, as shown in Figs. 1, 2, and 3.

On the back $c\ c$ is arranged the vertically-adjustable back-rest $f$, which is provided with guide-pieces $f'\ f'$ at its rear side, which are guided between the uprights $c\ c$ as the rest $f$ is moved up and down. After the rest $f$ is adjusted to the desired height above the seat it is secured in place by means of the screw $g$, which is fastened to the rest $f$, and the nut $g'$ screwed against the rear of the fastening plate or bar $h$, the ends of which rest on the rear of the uprights $c\ c$, as shown in Figs. 1 and 4. A perforation is made midway on the fastening-plate or bar $h$, through which the screw $g$ projects, as shown.

The rest $f$ may be adjusted up and down on the back $c\ c$ simply by loosening the nut $g'$ and moving the said rest up or down to the desired position, where it may be secured by tightening the nut $g'$ against the fastening plate or bar $h$.

Thus it will be seen that I provide with my invention a detachable seat-back which can be very easily adjusted, both in a forward and rearward as well as vertical direction, to suit the inclination and size of the person using the chair or seat.

What I wish to secure by Letters Patent, and claim, is—

1. The herein-described detachable and adjustable seat-back, consisting of the back $c\ c$, provided at its lower end with the cross-bar $d$, firmly secured to said back, and having elongated slots $d'\ d'$, the whole being adjustably secured to the seat by means of bolts $e\ e$, and the guide-piece $a'$, secured to the under side of the seat, and adapted to fit a corresponding recess, $d''$, in the cross-bar $a$, substantially as described, and for the purpose set forth.

2. An adjustable rest for chair-backs, consisting of the back-support $f$, provided with guides $f'\,f'$, adapted to slide on the interior of the back $c\,c$, and bar $h$, secured at each end to the guides $f'\,f'$, the whole being adjustably secured to the chair-back by means of the bolt $g$ and nut $g'$, substantially as described, and for the purpose specified.

In testimony whereof I have affixed my signature in presence of two witnesses.

LOUIS POSTAWKA.

Witnesses:
ALBAN ANDRÉN,
HENRY CHADBOURN.